United States Patent [19]
Cortellucci et al.

[11] Patent Number: 6,099,806
[45] Date of Patent: Aug. 8, 2000

[54] CHEMICAL GAS GENERATOR

[75] Inventors: Arthur Cortellucci, Buffalo, N.Y.;
Itamar Bodek, Lynnfield, Mass.; Roy J. Grabski, Depew, N.Y.; James R. Valentine, Reading, Mass.

[73] Assignee: Scott Technologies, Inc., Beechwood, Ohio

[21] Appl. No.: 09/098,089

[22] Filed: Jun. 16, 1998

Related U.S. Application Data

[62] Division of application No. 08/944,589, Oct. 6, 1997, Pat. No. 5,772,976, which is a continuation of application No. 08/457,523, Jun. 1, 1995, abandoned.

[51] Int. Cl.$^7$ ...................................................... A62B 7/08
[52] U.S. Cl. .......................... 422/126; 422/120; 422/123; 422/125; 423/579
[58] Field of Search ............................... 422/4, 120, 123, 422/125, 126; 423/579

[56] References Cited

U.S. PATENT DOCUMENTS 3,615,251  10/1971  Klenk ...................................... 423/579

FOREIGN PATENT DOCUMENTS 2160187  12/1985  United Kingdom .................... 423/579

*Primary Examiner*—Terrence R. Till
*Assistant Examiner*—Fariborz Moazzam
*Attorney, Agent, or Firm*—Hodgson Russ Andrews Woods & Goodyear LLP

[57] ABSTRACT

A chemical oxygen or other gas generator which has a container composed of thermally-conductive and gas-impervious material which contains pyrotechnic material, the container being in heat transfer relation with a block of oxygen-producing material for transfer of heat from burning of the pyrotechnic material within the container directly to the block of oxygen-producing material for initiation of decomposition thereof. The container is sealingly attached to the casing so that all of the evolved gases from burning of the pyrotechnic material are segregated from the produced breathable oxygen. The evolved gases are vented from the oxygen generator so as to reduce the ignition chamber pressure and/or allow a greater amount of pyrotechnic material to be burned within the ignition chamber so that a sufficient amount of heat may be generated within the ignition chamber for application to the block of oxygen producing material for initiation of decomposition thereof. This also allows the providing of pyrotechnic material within the space occupied by the oxygen-producing material for initiating decomposition thereof to be desirably eliminated so that a smaller filter capacity is required. The container has a first portion composed of a material which serves as a heat sink for transferring the heat to the block of oxygen producing material of such magnitude and over a period of time to effect initiation of decomposition thereof. A second portion of the container, which is not in direct contact with the pyrotechnic material, is composed of a material for restricting heat transfer to the casing.

24 Claims, 3 Drawing Sheets

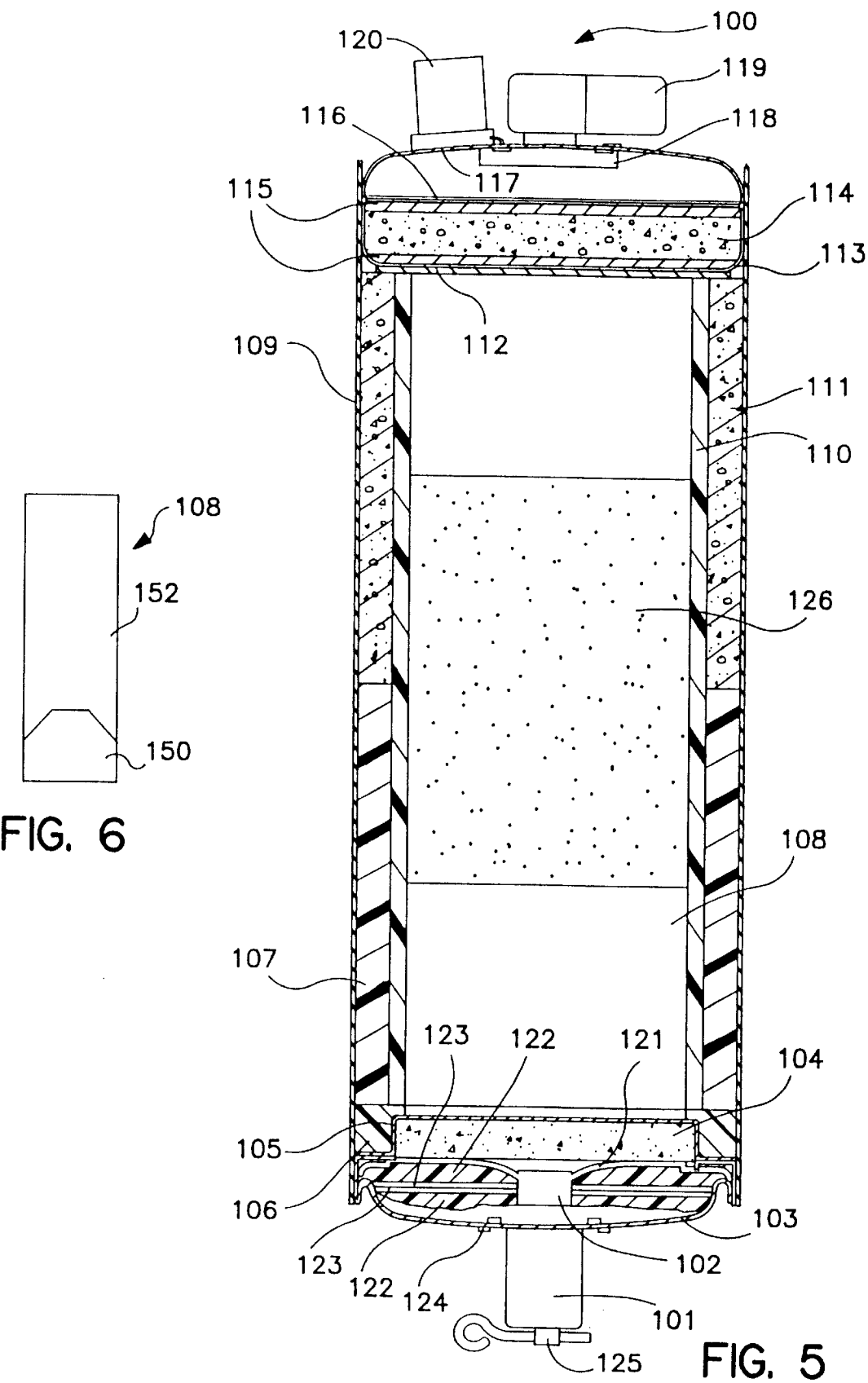

CHEMICAL GAS GENERATOR

CROSS REFERENCE TO A RELATED APPLICATION

This application is a division of application Ser. No. 08/944,589 filed Oct. 6, 1997, now U.S. Pat. No. 5,772,976, as a continuation of application Ser. No. 08/457,523 filed Jun. 1, 1995, now abandoned.

The present invention relates generally to gas generators wherein a material (such as an alkaline metal chlorate candle) undergoes an exothermic chemical reaction thereby decomposing to produce gas such as, for example, oxygen for use by airplane pilots in the event of loss of pressure.

Examples of chemical gas generators are found in U.S. Pat. Nos. 3,615,251; 3,736,104; 3,742,683; 3,861,880; 3,868,225; 4,212,846; 4,623,520; 4,891,189; 4,925,631; 4,981,655; and 5,338,516.

As illustrated in U.S. Pat. No. 4,623,520, decomposition of the chlorate candle of a chemical oxygen generator is initiated by means of a fuse, which includes the burning of a combustible ignition material. As disclosed in U.S. Pat. No. 4,925,631, which is assigned to the assignee of the present invention and which is incorporated herein by reference, oxygen from decomposition of a chlorate candle is passed through a filter assembly, and the filtered oxygen is then exited through an outlet for use.

U.S. Pat. No. 3,615,251 discloses an oxygen-producing alkali metal chlorate candle having an ignition core that is ignited by flash powder. A brass or stainless steel mesh screen is disposed between the ignition core and the flash powder to provide improved ignition.

As discussed in the '520 patent, the oxygen given off by the generating blocks of prior oxygen generators such as that of the '251 patent contains appreciable amounts of impurities from the burning of the igniter material. These impurities are filtered out by filters which occupy a substantial amount of space, and space in an oxygen generator is at a premium.

The '520 patent suggests separating the thermal primer from the oxygen generating material by means of a cylindrical chamber defined by a thermally transmissive but gas impervious stainless steel screen to prevent gaseous impurities produced by the primer from reaching the outlet valve.

An end portion of the screen chamber of the '520 patent extends into a chamber which is hollowed out of the chlorate block and which contains what is described as a transmission composition or flash. The thermal screen transmits heat to the flash which then burns to initiate decomposition of the chlorate block.

Although the presence of the thermal screen of the '520 patent may prevent penetration to the interior of the generator of any gas coming from the fuse or from the igniter composition within the screen chamber, the gases which evolve during the burning of the flash do mix with and contaminate the generated oxygen. The '520 patent discloses in its oxygen generator a molecular sieve and metal filter for removing impurities and possible fibrous particles contained in the generated oxygen, which would include evolved gases from burning of the flash composition. It is considered desirable to prevent even these evolved gases from contaminating the generated gas so that the filter-containing space may be minimized.

The screen chamber of the '520 patent is closed by the fuse to constitute a fluid tight chamber at altitudes on the order of 15,000 meters. The closed chamber results in higher ignition pressures necessitating higher strength of materials resulting undesirably in increased weight and cost and/or limit the amount of igniter composition which can be burned within the chamber so that there may be insufficient heat generated within the chamber for initiating decomposition of the chlorate block. Burn-through of the screen may also occur.

It is accordingly an object of the present invention to prevent gases evolved during burning of a pyrotechnic material for initiation of decomposition of the chlorate candle or other gas producing material from contaminating the produced breathable oxygen or other gas.

It is another object of the present invention to reduce ignition pressure so that a greater amount of pyrotechnic material may be burned to generate sufficient heat for initiating decomposition of the gas producing material.

It is a further object of the present invention to provide an oxygen generator which is rugged, reliable, and effective and wherein the size, weight, and cost of manufacture are minimized.

In accordance with the present invention, a gas generator such as an oxygen generator has a container composed of thermally-conductive and gas-impervious material which contains a quantity of pyrotechnic material, the container being in heat transfer relation with the block of gas producing material for transfer of heat from burning of the pyrotechnic material within the container directly to the block of gas producing material for initiation of decomposition thereof. The use of flash or pyrotechnic material within the space containing the gas producing material block may thus be eliminated so that all of the gases evolved in supplying heat for initiating decomposition of the gas producing material may be segregated from the produced gas. The evolved initiation gases are vented from the gas generator so as to reduce the ignition chamber pressure and/or allow the use of a greater amount of pyrotechnic material so that a sufficient amount of heat may be generated within the ignition chamber for application to the block of gas producing material. The container has a first portion which is composed of type and mass of material to serve as a heat sink for holding the heat from burning of the pyrotechnic material in heat transfer relation with the block of gas producing material for a period of time to effect initiation of decomposition thereof. A second portion, which forms the side of the container and which is not in direct contact with the gas producing material, is composed of a type and mass of material selected for restricting heat transfer to the casing.

The above and other objects, features, and advantages of the present invention will be apparent in the following detailed description of the preferred embodiment thereof taken in conjunction with the accompanying drawings wherein the same reference numerals denote the same or similar parts throughout the several views.

BRIEF DESCRIPTION OF THE DRAWINGS

FIG. 5 is a diagrammatic plan view, partly sectioned, of an embodiment of the oxygen generator to illustrate the positioning of various filters and insulators along with other components therein.

FIG. 6 is a diagrammatic view of a chlorate block therefor illustrating the composition make-up.

DETAILED DESCRIPTION OF THE PREFERRED EMBODIMENT

Figure 1:
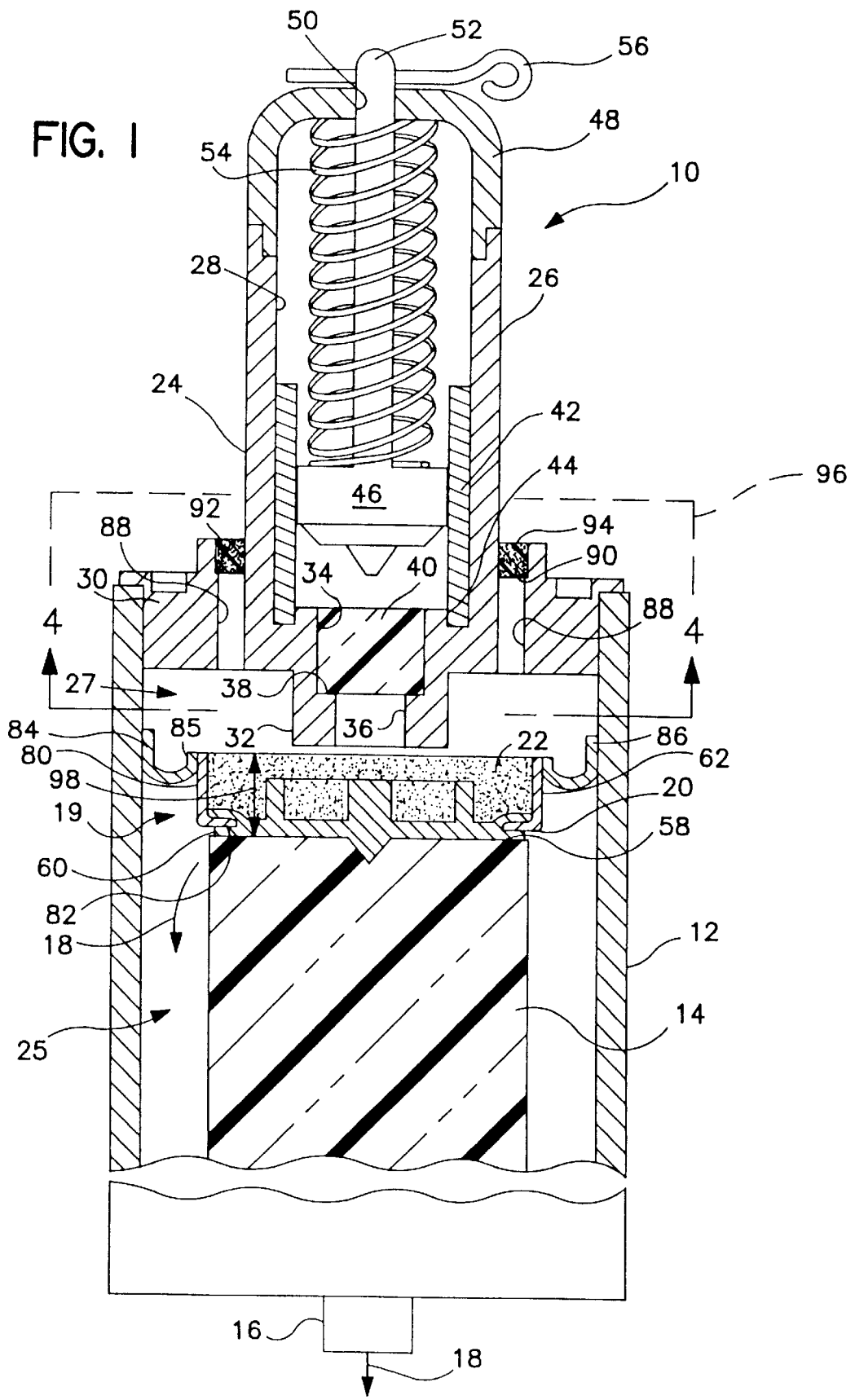
FIG. 1 is a longitudinal sectional view, partly not sectioned, of an oxygen generator which embodies the present invention.
Figure 3:
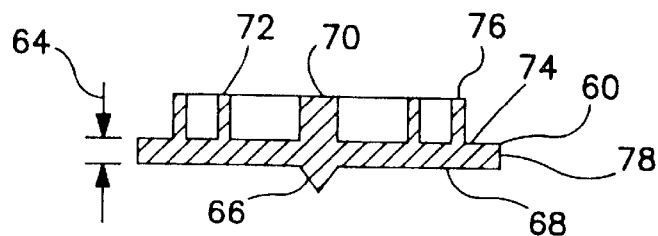
FIG. 3 is a sectional view of the heat sink portion taken along lines 3—3 of FIG. 2.
Figure 4:
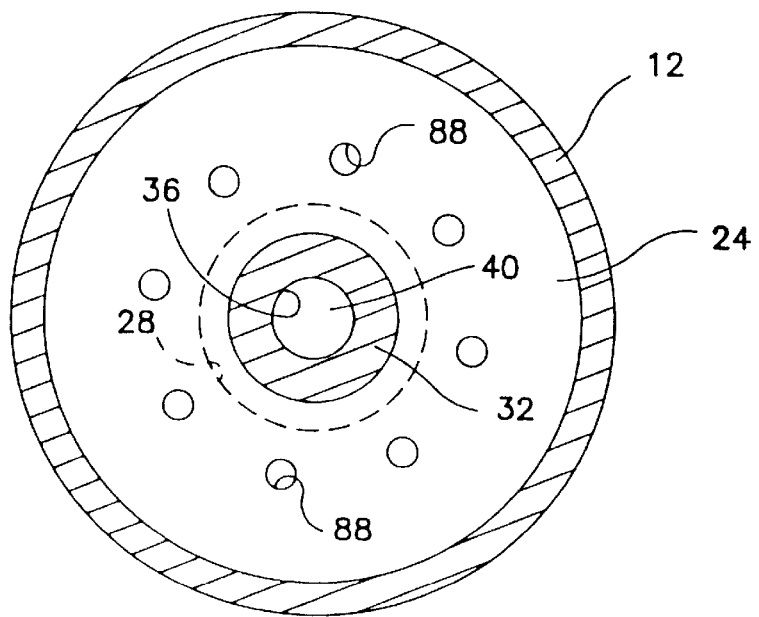
FIG. 4 is a sectional view of the oxygen generator taken along lines 4—4 of FIG. 1.

Referring to FIGS. 1 and 4, there is illustrated generally at 10 a chemical oxygen generator which has an elongate cylindrical casing 12 which contains a generally elongate cylindrical block or candle 14 of gas producing material which undergoes an exothermic chemical reaction thereby decomposing in the course of which oxygen is generated or produced for breathing, when heat is supplied thereto for initiating such decomposition. The oxygen producing block 14 may desirably be composed of an alkaline metal chlorate such as, for example, sodium chlorate material. It should, however, be understood that the present invention is not meant to be limited to oxygen producing materials but is applicable to materials which decompose to produce other gases such as, for example, hydrogen. Suitable insulation material (not shown in FIGS. 1 to 4) is provided between the chlorate candle 14 and the casing 12. The generated oxygen flows downwardly along the casing, through a suitable filter assembly (not shown in FIGS. 1 to 4), and through an outlet 16 in the bottom of the generator, as illustrated at 18, for use. A catalyst (not shown in FIGS. 1 to 4) for removal of carbon monoxide is also provided at the outlet. FIG. 5 illustrates a suitable lay-out of insulation and filter materials, and the description of the embodiment of FIG. 5 is provided hereinafter. A small amount of carbon monoxide and other gaseous impurities evolve from the decomposition of the chlorate block 14, and the filter assembly and catalyst are provided to remove these impurities. The terms "up" and "down" and variants thereof, as used herein, are meant to refer to the generator as shown in FIG. 1. Thus, the outlet 16 is shown and is referred to as being at the bottom though in use of the generator it may be at the top. These terms are thus used merely as a convenience in relating spatial relationships.

A decomposition initiation assembly, illustrated generally at 19, is shown above the block 14 for generating the heat required for raising the block 14 to the decomposition temperature for a period of time to initiate exothermic decomposition, i.e., the application of the heat over a sufficient period of time so that thereafter decomposition can be maintained without further supply of heat thereto. Once initiated, the heat generated from decomposition maintains a temperature to sustain the chemical reaction. The initiation assembly 19 includes a container 20 in which is suitably compressibly packed a suitable pyrotechnic powder, illustrated at 22, which is composed of a fuel and an oxidizer, such as, for example, perhaps about 8 grams of a suitable mixture comprising, by weight, about 68% titanium oxide, about 17% potassium perchlorate, about 14.5% titanium, and about 0.5% iron oxide. Hereinafter and in the claims, the term "pyrotechnic" is meant to refer to a material such as material 22 which may be made to cause a sudden release of heat or thermal energy, and the term "gas producing" is meant to refer to a material such as material 14 which decomposes, liberating oxygen or other gas. Pyrotechnic material is to be distinguished from materials which may be mixed with the gas producing material to act as catalysts. Instead of causing a sudden release of thermal energy for supplying heat for decomposition of a gas producing material, such a catalyst acts to reduce the temperature at which decomposition of a gas producing material can take place.

Suitably sealingly attached such as by welding to the casing 12 is a fitting 24 which includes a generally cylindrical portion 26 having a bore 28 and a flange portion 30 extending radially from the lower portion of the cylindrical portion 26 to the casing 12. A centrally disposed cylindrical portion 32 extends downwardly from the flange portion 30. Centrally located within the cylindrical portion 32 is a cylindrical cavity 34 which has a diameter less than the diameter of bore 28. A bore 36 extends downwardly through portion 32 and opens out the lower end thereof. Cavity 34 is in flow communication with bores 28 and 36. Bore 36 has a smaller diameter than that of the cavity 34 thereby defining a shoulder 38.

A suitable percussion primer 40, which may, for example, be a Winchester cap sold by the Winchester Division of Olin Corp., is disposed in cavity 34 to rest on shoulder 38 so that it is prevented from downward displacement. The primer 40 may be any other suitable primer. It should be understood that this invention is not limited to the use of percussion-type primer as the ignition source, but other suitable ignition sources such as, for example, electrical igniters may be provided for igniting the pyrotechnic material. A cylindrical liner 42 extends along the length of the lower portion of bore 28, and its lower end is received in a cylindrical notch 44 in the flange portion 30. A cylindrical member 46 which serves as a striker is disposed for vertical movement in liner 42 downwardly into percussion contact with primer 40 for firing thereof.

The upper end of the bore 28 is closed by a dome-shaped member 48 which is suitably sealingly attached to the upper end of cylinder 26 such as by welding, crimping or threading. A centrally disposed aperture 50 extends through the dome 48. The aperture 50 receives the upper end portion of a rod 52. The rod 52 may be formed integral with or otherwise suitably attached to striker 46. The striker 46 is spring-biased for downward movement into percussion engagement with primer 40 by a spring 54 which surrounds the rod 52 and is disposed between the striker 46 and dome 48. The striker 46 is held in an armed position spaced from percussion primer 40, as seen in FIG. 1, by a pin 56 which is received in an aperture (not shown) in the upper portion of the rod 52 above the dome 48. Manual removal of the pin 56 allows downward movement of the striker 46 into percussion contact with primer 40 to initiate burning of the pyrotechnic powder 22 to generate the heat needed to ignite and maintain decomposition of the chlorate block 14. Except as otherwise described herein, the structure of the oxygen generator 10 including the firing means is known to those of ordinary skill in the art to which this invention pertains and therefore will not be described in greater detail herein.

In accordance with the present invention, all of the gases which are evolved in supplying heat for initiating decomposition of the chlorate candle 14 are segregated from the oxygen generated by the chlorate candle 14 so that the filter volume for filtering the generated oxygen may be desirably minimized. There may, of course, still be small amounts of impurities arising from decomposition of the chlorate candle which may still require filtering. In order to achieve such segregation, the container 20 is welded or otherwise suitably sealingly attached to the casing 12 and all of the pyrotechnic materials for supplying the heat for initiation of decomposition of the chlorate candle are disposed in the container 20 or within the ignition chamber 27 the lower boundary of which is defined by container 20 so that no pyrotechnic materials are disposed in the space, illustrated at 25, in which the chlorate candle 14 is contained. The container 20 is composed of materials which, in addition to being heat conductive, are impervious to gases which evolve during burning of the pyrotechnic materials to thereby serve as a barrier between the evolved gases in chamber 27 and the generated oxygen in space 25.

The initiation of decomposition of the chlorate candle 14 is dependent on the heat of combustion of the pyrotechnic powder 22 within the container 20 supplying heat thereto over a length of time so that maintenance of decomposition is thereafter sustained exothermically. If the heat is not applied to the core 14 over a sufficient period of time, the core 14 may self-extinguish when the heat is no longer supplied. In order to suitably provide the heat required, the container 20 is disposed in heat transfer relation with the chlorate candle 14 for transfer of heat from burning of the pyrotechnic powder 22 directly to the block of gas producing material 14. Thus, as seen in FIG. 1, the bottom wall 60 of container 20 is shown in direct contact with the upper surface 58 of the chlorate candle 14. By "transfer of heat directly to the block of gas producing material" is meant, for the purposes of this specification and claims, that the heat is transferred to the block of gas producing material without its transference to an intermediate pyrotechnic material which is then burned to generate the heat for initiation of decomposition thereof. Additives such as catalysts, binders, and fuels dispersed within the block of gas producing material, which aid in decomposition after initiation has occurred, should not be considered to be intermediate pyrotechnic materials, and such additives should therefore not be characterized as evolving gases for initiation of decomposition of the gas producing material. Thus, the heat which passes through the container 20 is applied not to flash powder or other pyrotechnic material but to the chlorate candle. It should of course be understood that there may be embodiments of the present invention wherein there is no direct physical contact between the container 20 and the chlorate candle 14. For example, heat conductive materials may be interposed between the container 20 and the chlorate candle 14. Such embodiments are understood to provide for heat transfer from the container 20 directly to the chlorate candle 14 and are meant to come within the present invention.

In order to direct the heat generated to the chlorate candle 14 for the length of time required for initiating decomposition, the container 20 is composed of two different materials. The material and geometry (size and shape) for the bottom wall 60 are chosen for the thermal needs of the gas producing material taking into consideration the pyrotechnic material which is used. Thus, the bottom wall 60 is composed of a relatively high thermal capacity material which may also have high thermal conductivity such as, for example, copper or brass to maximize the transfer of heat therethrough to the chlorate candle 14. It should be understood that the bottom wall 60 may be made of any other suitable material. As seen in FIG. 1, the container 20 also has a generally circular side wall 62 which is not in contact with the chlorate candle 14 so that heat transferred therethrough would be less effective for igniting the chlorate candle 14. Accordingly, the side wall 62 is composed of a material such as, for example, stainless steel, which will limit the wasteful flow of heat to the casing while having sufficient structural strength.

Figure 2:
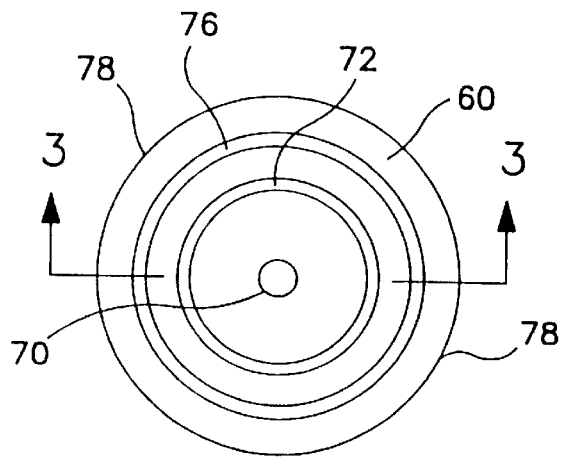
FIG. 2 is a plan view of a heat sink portion of a pyrotechnic material container therefor prior to its assembly into the container.

Heat must be transferred to the chlorate candle 14 over a period of time so that oxygen-producing decomposition of the chlorate candle is sufficiently initiated that decomposition is maintained without further transfer of heat thereto. In order to provide for the heat transfer over the necessary period of time, the bottom wall 60 is illustrated to have a thickness, illustrated at 64, and has projections, as hereinafter described, so that it has a thick mass to serve as a suitable heat sink for the needed duration of heat retention in order to moderate the rate of heat or thermal energy transfer to the chlorate candle 14 to supply heat for the desired period of time to achieve maintenance of decomposition without further transfer of heat thereto. A centrally disposed conical portion 66 projects from the lower bottom wall surface 68 into the chlorate candle 14. A centrally disposed cylindrical portion 70 and a circular portion 72 concentric therewith project upwardly from the upper bottom wall surface 74. Referring to FIGS. 2 and 3, there is shown the bottom wall portion 60 before its connection to the side wall portion 62 for fabrication of the container 20. As shown therein, the bottom wall portion 60 also has a circular portion 76 which is concentric with portions 70 and 72 and projects upwardly from upper surface 74. Portion 76 is spaced from the circular edge 78 of the bottom wall 60 a distance which is equal approximately to its height.

The side wall 62 has a cylindrical portion 80 the diameter of which is equal approximately to that of bottom wall edge 78. The side wall 22 is further formed to have a portion 82 which extends inwardly from the lower end of portion 80 and which lies along the upper bottom wall surface 74 between edge 78 and projection 76. The projection 76 is bent to overlie portion 82 so that portion 82 is sandwiched between projection 76 and the upper bottom wall surface 74, and portion 82 is welded or otherwise suitably sealingly attached to projection 76 and upper bottom wall surface 74.

The container 20 is suitably sealingly attached to the casing 12 by means of a thin annular member 84 composed of stainless steel or other suitable material which is welded along a generally cylindrical inner edge portion 85 to the upper edge portion of side wall portion 80 and along a generally cylindrical outer edge portion 86 to the inner wall of casing 12.

The side wall 62, as well as member 84, is relatively thin as well as being composed of a material which will limit flow of heat to the casing while having sufficient structural strength.

If the chamber 27 is fluidtight so that the combustion gas cannot escape, the resulting high pressure therein will require greater thicknesses of chamber parts to contain the higher pressure resulting undesirably in greater weight, space, and cost, or a reduced amount of pyrotechnic material can be provided in container 20. However, a reduced amount of pyrotechnic material may be inadequate to initiate decomposition of the chlorate candle. In order to reduce the combustion pressure build-up and/or allow an increased amount of pyrotechnic powder 22, means are provided for venting the ignition gases from the generator assembly 10 to the surrounding atmosphere. If desired, the ignition gases may be vented to a suitable chamber. In accordance with a preferred embodiment, the venting means comprises a plurality of perhaps eight vent passages or apertures, illustrated at 88, generally uniformly spaced circumferentially in the flange portion 30 of the ignition fitting 24 adjacent and outwardly of the cylindrical portion 26.

An annular relief, illustrated at 90, is provided in the upper or outlet end portion of each aperture 88, providing a shoulder 92. In order to close or plug the venting passages 88 when the generator 10 is not in use so as to seal the chamber 27 from outside contamination which could degrade the flash mix and percussion primer, a fusible material, illustrated at 94, is disposed within each of the annular reliefs 90. This material 94 may desirably be a wax material which may be poured and allowed to harden and preferably sticks securely in place. This material 94 may be selected to melt at above usual ambient temperatures, i.e., in the range of 110 to 250 degrees F. to allow venting of the combustion gases after combustion has begun. A suitable fusible material 94 may, for example, be a thermally-indicating material known as Tempilaq material which is available in liquid form and dries to a solid and is obtainable from Big Three Industries, Inc. of South Plainfield, N.J. Another suitable material is one known as Wood's Metal material which is available commercially from Cerro Metal Products Co. of Bellefonte, Pa., provided this Wood's Metal Material can be sufficiently adhered to the material of which the fitting 24 is made.

A suitable flame arrester, illustrated schematically at 96, is provided around the outlets of the vent passages 88 to permit the venting of the ignition gases to be achieved safely. The flame arrester 96 may alternatively be provided in chamber 27 around the vent passage inlets or within the vent passages 88 or at more than one of the above locations.

It should of course be understood that the venting means as well as the segregating means can be embodied otherwise without departing from the present invention. For example, a first set of vent passages may be provided in the flange portion to have outlets within the bore of the cylindrical portion of the initiation fitting, and a second set of vent passages may be provided in the cylindrical portion. For another example, a perforated cap providing vent passages may be provided to close the casing upper end, the vent passages being closed by a relief cap bearing against an o-ring. As the combustion pressure builds up, the relief cap will lift to vent the gases to the surrounding atmosphere. For yet another example, a check valve may be provided for sealing the initiation chamber yet for allowing the egress therefrom of the evolved ignition gases.

The following example is provided for exemplary purposes only and not for purposes of limitation. The copper heat sink 60 may have a thickness 64 of perhaps about 0.050 inch. The diameter of edge 78 may perhaps be about 1.37 inch. Each of the projections 70, 72, and 76 may extend over a height of perhaps about 0.160 inch. Projection 70 may have a diameter of perhaps about 0.166 inch, and projections 72 and 76 may have thicknesses of perhaps about 0.062 and 0.020 inch respectively. The inner diameters of projections 72 and 76 may be perhaps about 0.705 and 1.120 inch respectively. The conical portion 66 may have a base diameter and height of perhaps about 0.125 and 0.13 inch respectively. The stainless steel members 62 and 84 each has a thickness of perhaps about 0.015 inch. Their edges are flush over a distance of perhaps at least about 0.015 inch for welding. The overall height, illustrated at 98, of the container 20 (exclusive of the conical portion 66) may perhaps be about 0.350 inch. The diameter of each of the apertures 88 may perhaps be about 0.034 inch. The counterbore 90 may have a height and width of perhaps about 0.060 and 0.040 inch respectively.

As previously discussed, the construction and location and sealing attachment of the container 20 is provided to achieve a segregation of all of the gases which evolve in supplying heat for initiating decomposition of the gas producing material from the generated breathable oxygen or other gas, with the heat from combustion of pyrotechnic materials being transmitted through the container directly to the block 14 of gas producing material for initiation thereof. This is provided to eliminate mixing (contamination) of the evolved ignition gases with the generated breathable oxygen delivered through outlet 16 so that the weight and space taken up by filtering material may desirably be reduced. For example, the assembly for filtering the generated oxygen need not contain a molecular sieve outlet filter but may contain a catalyst for carbon monoxide and granular absorption media for chlorine or other suitable means for removing these small amounts of impurities which arise from decomposing of the chlorate candle. Venting of the evolved ignition gases from the generator assembly allows the use of a greater amount of pyrotechnic powder 22 so that sufficient heat over a sufficient period of time may be provided for initiating decomposition of the chlorate candle 14.

With the above principles in mind, there is shown generally at 100 in FIG. 5 an embodiment of the oxygen generator for the purpose of showing the lay-out of filtering and insulating materials. The outer shell or casing is shown at 109. The shell contains a chlorate core 108 which is similar to core 14. A ¹⁄₁₆ inch insulator sheet 110, the central portion of the inner surface of which is covered with perhaps about 20 grams of copper powder, illustrated at 126, to aid in thermal management, surrounds the core 108. A ⅛ inch insulator sheet 107 surrounds sheet 110 along the upper half ("lower" being, consistent with the description of the embodiment of FIG. 1, at the oxygen gas outlet 119) of the core. A quantity of perhaps 27 grams granular chlorine sorbent 111 surrounds sheet 110 along the lower half of the core. At 112 is a 1.75 inch outer diameter perforated screen below and adjacent the core. Adjacent the screen 112 is a filter cup 113. Below filter cup 113 is a quantity of perhaps 20 grams carbon monoxide sorbent 114 sandwiched between upper and lower filter pads 115. Adjacent the lower filter pad 115 is a compression ring 116. The head and exhaust assembly 117 containing the outlet 119 is attached by pressing to a fitting 118 which is in turn crimped to assembly 117 with a suitable gasket. A relief valve assembly 120 is suitably mounted to the lower end of the casing 109. A flash cap assembly 105, which is similar to container 20 in FIG. 1, is welded to the casing 109 so as to be disposed adjacent the upper surface of core 108 and contains 8 grams of flash powder 104 similar to pyrotechnic material 22. An insulator ring 106 is provided between the flash cap assembly 105 and the casing 109. An ignition head 103 is mounted to the upper end of the casing 109 along with fitting 101 which may be similar to fitting 24 and which contains striker spring and pin assembly 125. An eyelet flange or tube 102 for a percussion primer is mounted to fitting 101 between the striker and the flash cap assembly 105. Fitting 101 is attached to head 103 by means of a mechanical crimp including a suitable gasket 124. Above and adjacent the flash cap assembly 105 is an insulation support pad 121 which is provided to reflect heat back toward the flash power. Between pad 121 and head 103 are a pair of perforated steel flame suppressor plates 123 sandwiched between a pair of insulation pads 122. The oxygen generator 100 may be constructed using the principles discussed with respect to FIGS. 1 to 4 and using principles commonly known to those of ordinary skill in the art to which this invention pertains.

Referring to FIG. 6, as previously discussed, the chlorate candle may contain a catalyst for lowering the temperature at which sustained decomposition takes place. The chlorate candle 108 as well as candle 14 contains a catalyst which may, for example, comprise cobalt oxide or a mixture of cobalt oxide and cobalt peroxide, but any suitable catalyst or none at all may be used. The upper portion 150 of the core 108 is shown to have one percent catalyst while the lower portion 152 constituting perhaps about 75% of the core 108 is shown to have 0.75 percent catalyst. The percentage of catalyst is dispersed within the above range in a non-uniform manner in accordance with principles commonly known to those of ordinary skill in the art to which this invention pertains. Since the catalyst is provided to maintain rather than cause initiation of the decomposition reaction, no further discusion of the catalyst is believed to be necessary.

It should be understood that while the invention has been described in detail herein, the invention can be embodied otherwise without departing from the principles thereof, and such other embodiments are meant to come within the scope of the present invention as defined by the appended claims.

What is claimed is:

1. A gas generator comprising a casing, a block of material which is disposed within said casing and which is capable of decomposing thereby producing a gas when supplied with heat for initiating decomposition thereof, outlet means for allowing the produced gas to exit the casing, means for supplying heat for initiating decomposition of said gas producing material said means for supplying heat being capable of evolving gases as a by-product of supplying heat, and means for segregating which is capable of keeping all gases evolved in supplying heat for initiating decomposition of said gas producing material from mixing with the produced gas.

2. A gas generator according to claim 1 wherein said segregating means comprises a container for pyrotechnic material which container is composed of thermally conductive material which is impervious to the evolved gases, said container being in heat transfer relation with said block of gas producing material for transfer of heat from burning of pyrotechnic material within said container directly to said block of gas producing material for initiating decomposition thereof.

3. A gas generator according to claim 2 wherein said container comprises a first portion composed of a first material which is in heat transfer relation with said block of gas producing material for transferring the supplied heat for a period of time to effect initiation of decomposition thereof, and said container further comprises a second portion composed of a second material for restricting heat transfer to the casing.

4. A gas generator according to claim 1 further comprising means for venting the evolved gases from the gas generator.

5. A gas generator according to claim 1 further comprising means for venting the evolved gases to atmosphere.

6. A gas generator according to claim 1 wherein said heat supplying means comprises a quantity of pyrotechnic material which evolves the gases during burning thereof.

7. A gas generator according to claim 1 wherein said gas producing material is a material which decomposes thereby producing oxygen.

8. A gas generator comprising a casing, a block of material which is disposed within said casing and which is capable of decomposing thereby producing a gas when supplied with heat for initiating decomposition thereof, outlet means for allowing the produced gas to exit the casing, means including a quantity of pyrotechnic material for generating heat for initiating decomposition of said gas producing material, and means for segregating gases evolved during burning of said pyrotechnic material from the produced gas, s aid segregating means comprising a container for said pyrotechnic material which container is composed of a thermally conductive material which is impervious to the evolved gases, said container being in heat transfer relation with said block of gas producing material for transfer of heat from burning of said pyrotechnic material within said container directly to said block of gas producing material for initiating decomposition thereof.

9. A gas generator according to claim 8 wherein said container comprises a first portion composed of a first material which is in heat transfer relation with said block of gas producing material for a period of time to effect initiation of decomposition thereof, and said container further comprises a second portion composed of a second material for restricting heat transfer to the casing.

10. A gas generator according to claim 8 further comprising means for venting the evolved gases from the gas generator.

11. A gas generator according to claim 8 further comprising means for venting the evolved gases to atmosphere.

12. A gas generator according to claim 8 wherein said gas producing material is material which decomposes thereby producing oxygen.

13. A gas generator comprising a casing, a block of material which is disposed within said casing and which is capable of decomposing thereby producing a gas when supplied with heat for initiating decomposition thereof, outlet means for allowing the produced gas to exit the casing, means including a quantity of pyrotechnic material for generating heat for initiating decomposition of said gas producing material, means for segregating which is capable of keeping said pyrotechnic material and gases evolved during burning thereof from mixing with said block of gas producing material and the produced gas, and means for venting the evolved gases from the burning of the pyrotechnic material from the gas generator, wherein the outlet means and the means for venting are separate and distinct.

14. A gas generator according to claim 13 further comprising means for igniting said pyrotechnic material and means for housing said igniting means, said venting means comprising aperture means in said housing means.

15. A gas generator according to claim 13 further comprises initiation chamber means containing said quantity of pyrotechnic material, and said venting means comprises means for sealing said chamber means and for allowing egress therefrom of the evolved gases.

16. A gas generator according to claim 13 comprising means for venting the evolved gases to atmosphere.

17. A gas generator according to claim 13 wherein said gas producing material is a material which decomposes to produce oxygen.

18. An oxygen generator comprising a casing, a block of material which is disposed within said casing and which is capable of decomposing thereby producing oxygen when supplied with heat for initiating decomposition thereof, outlet means for allowing the produced oxygen to exit the casing, means including a quantity of pyrotechnic material for generating heat for initiating decomposition of said oxygen producing material, and means for segregating gases evolved during burning of said pyrotechnic material from the produced oxygen, said segregating means comprising a container for said pyrotechnic material, said container having a first portion which is disposed in heat transfer relation with said block of oxygen producing material for transfer of heat from burning of said pyrotechnic material within said container to said block of oxygen producing material for initiation of decomposition thereof and which is composed of a first material which is impervious to the evolved gases, and said container having a second portion which is composed of a second material which is impervious to the evolved gases and which restricts heat transfer to the casing.

19. An oxygen generator according to claim 18 wherein said first material is copper and said second material is stainless steel.

20. An oxygen generator according to claim 18 wherein said first portion is relatively thick and has a mass which serves as a heat sink to hold heat from burning of said pyrotechnic material in heat transfer relation with said block of pyrotechnic material for a period of time to effect initiation of decomposition thereof, and said second portion is relatively thin.

21. An oxygen generator according to claim 18 further comprising means for venting the evolved gases from the oxygen generator.

22. An oxygen generator comprising a casing, a block of material which is disposed within said casing and which is capable of decomposing thereby producing oxygen when supplied with heat for initiating decomposition thereof, outlet means for allowing the produced oxygen to exit the casing, means including a quantity of pyrotechnic material for generating heat for initiating decomposition thereof, decomposition of said oxygen producing material, and means for segregating gases evolved during burning of said pyrotechnic material from the produced oxygen, said segregating means comprising a container for said pyrotechnic material, said container having a first portion which is disposed in heat transfer relation with said block of oxygen producing material for transfer of heat from burning of said pyrotechnic material within said container to said block of oxygen producing material for initiating decomposition thereof and which is composed of a material which is impervious to the evolved gases, said first portion having a mass which serves as a heat sink to hold heat from burning of said pyrotechnic material in heat transfer relation with said block of oxygen producing material for a period of time to effect initiation of decomposition thereof, and said container having a second portion which is composed of a second material which is impervious to the evolved gases for restricting heat transfer to the casing.

23. An oxygen generator according to claim 22 wherein said first material is copper and said second material is stainless steel.

24. An oxygen generator according to claim 22 further comprising means for venting the evolved gases from the oxygen generator.

* * * * *